United States Patent
Evans et al.

(10) Patent No.: US 7,366,898 B2
(45) Date of Patent: Apr. 29, 2008

(54) METHOD AND APPARATUS FOR PERFORMING CONFIGURATION OVER A NETWORK

(75) Inventors: Steven Evans, Bucks (GB); James E. King, Berkshire (GB); Martin Mayhead, Surrey (GB); Karen Roles, Surrey (GB)

(73) Assignee: Sun Microsystems, Inc., Santa Clara, CA (US)

( * ) Notice: Subject to any disclaimer, the term of this patent is extended or adjusted under 35 U.S.C. 154(b) by 941 days.

(21) Appl. No.: 10/679,869

(22) Filed: Oct. 6, 2003

(65) Prior Publication Data

US 2005/0055575 A1   Mar. 10, 2005

(51) Int. Cl.
*H04L 9/00* (2006.01)
*H04L 9/32* (2006.01)

(52) U.S. Cl. ............... 713/160; 713/161; 713/189; 726/3

(58) Field of Classification Search ........ 713/160–162, 713/165, 167, 189; 726/3; 709/228
See application file for complete search history.

(56) References Cited

U.S. PATENT DOCUMENTS

| | | |
|---|---|---|
| 5,951,639 A | 9/1999 | MacInnis |
| 6,490,677 B1 | 12/2002 | Aguilar et al. |
| 6,601,096 B1 | 7/2003 | Lassiter, Jr. |
| 7,032,242 B1 * | 4/2006 | Grabelsky et al. ............ 726/11 |

| | | |
|---|---|---|
| 2002/0099803 A1 | 7/2002 | Cheshire |

FOREIGN PATENT DOCUMENTS

| | | |
|---|---|---|
| CN | 1334510 | 2/2002 |
| EP | 1283464 | 2/2003 |
| WO | 01/09722 | 2/2001 |
| WO | 02/100070 A1 | 12/2002 |

OTHER PUBLICATIONS

International search report application No. GB0320857.6 mailed Jul. 2, 2004.

(Continued)

*Primary Examiner*—Hosuk Song
(74) *Attorney, Agent, or Firm*—Meyertons Hood Kivlin Kowert & Goetzel, P.C.

(57) ABSTRACT

A method and apparatus are provided for passing configuration information over a network. In one embodiment, the configuration information is passed between a DHCP server and a DHCP client and includes parameters not formally defined within DHCP. The parameters are therefore encoded into a vendor-specific portion of a DHCP message using at least one triplet comprising a code field, a length field, and a value field. The value field comprises a set of one or more name-value pairs. The code field includes an indication of encryption of the value field. In another embodiment, a fixed-function appliance device is attached to a network, and is booted using boot code and a configuration stored locally to the device. The device then downloads a network configuration, which is compared to the locally stored configuration. If the network configuration is different from the locally stored configuration, the network configuration is stored locally to the device. The device is then rebooted using the stored network configuration.

23 Claims, 9 Drawing Sheets

OTHER PUBLICATIONS

ZENWorks for Desktops Preboot Srevices: A Technical Overview—Novell AppNotes: Jul. 2, 2004 Author K Burnett, http://developer.novell.com/research/appnotes/2002/february/01/apv.html.

RFC2132—"DHCP Options and BOOTP Vendor Extensions"—Obtained from www.faqs.org/rfcs/rfc2132.html; S Alexander, Mar. 1997.

RFC1447—"BOOTP Vendor Information Extensions"; Obtained from www.faqs.org/rfcs/rfc1497.html; J Reynolds, Aug. 1993.

International search report application No. GB 0320857.6 mailed Feb. 25, 2004.

"Requirements for Internet Hosts—Application and Support", R. Braden, Network Working Group, Internet Engineering Task Force, Oct. 1989, http://www.cis.ohio-state.edu/cgi-bin/rfc/rfc1123.html.

"RFC2132—DHCP Options and BOOTP Vendor Extensions", S. Alexander, et al, Network Working Group, Mar. 1997, http://www.faqs.ord/rfcs/rfc2132.html.

"Cisco IOS Software Releases 11.3—Configuration File Commands", Cisco Systems, Inc., San Jose, CA, believed available Dec. 1997, http://www.cisco.com/en/US/products/sw/iosswrel/ps1826/products_command_reference_chapter09186a00800c3b.html.

\* cited by examiner

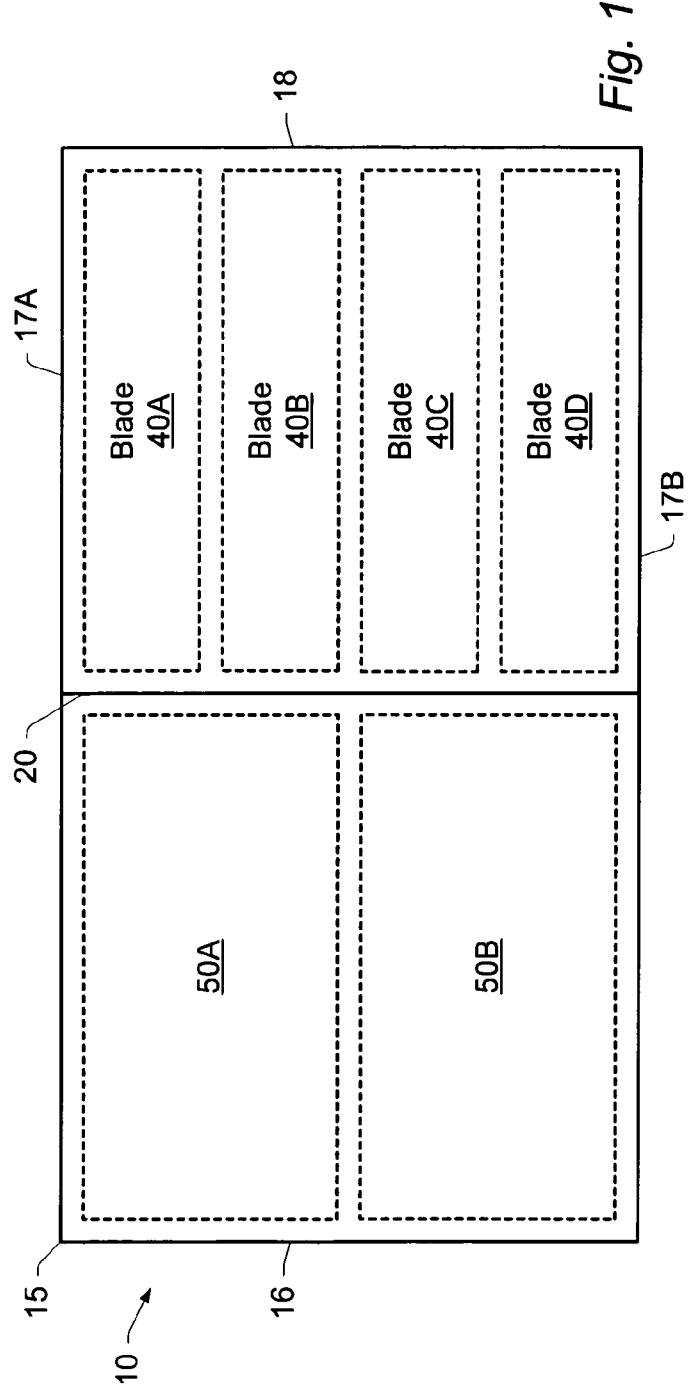
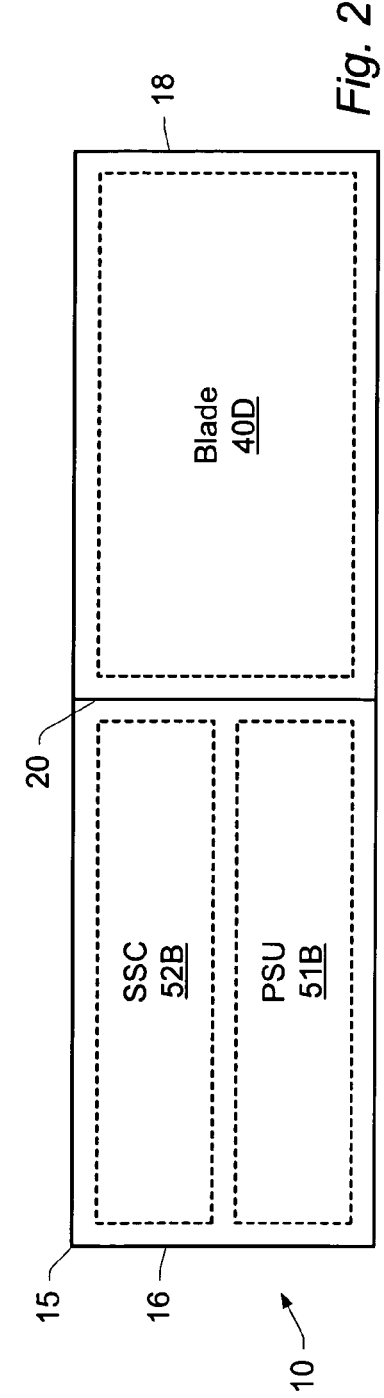
Fig. 1
Fig. 2

| Code 510 | Length 511 | Value 512 |

*Fig. 5A* ← 500

| Code 510A | Length 511A | Value 512A |

*Fig. 5B* ← 500A

| Encryption Code 510B | Length 511B | Name-Value Pair(s) 512B |

*Fig. 5C* ← 500B

METHOD AND APPARATUS FOR PERFORMING CONFIGURATION OVER A NETWORK

FIELD OF THE INVENTION

The present invention relates to performing configuration over a network, typically involving the dynamic host configuration protocol (DHCP).

BACKGROUND OF THE INVENTION

Modern computing systems are increasingly based on modular designs. In one typical approach, a server comprises a rack of multiple shelves, each shelf potentially holding multiple computing subsystems referred to as blades. Such an architecture has the advantages of easy scalability (processing capacity can be adjusted by simply adding blades to or removing blades from the rack, as appropriate) and fault tolerance (if any particular blade fails, its processing load can be transferred to one or more other blades).

One drawback with such a blade architecture is that system configuration can become a relatively time-consuming operation. Thus in a typical implementation, each shelf incorporates at least one system controller that can be used to configure all of the blades within that shelf. In larger installations there may be multiple shelves in a rack, and indeed multiple racks. Consequently, there may be a significant number of shelves, and hence system controllers, to be supplied with configuration information. In many existing systems, such configuration has to be done separately for each system controller in question. In addition, there may be other components within a shelf that need configuration apart from the system controller, such as a switch or firewall device. If the number of shelves in the system is large, it will be appreciated that configuration of the complete system therefore represents a rather laborious task.

SUMMARY OF THE INVENTION

Accordingly, one embodiment of the invention provides a method of passing configuration information between a DHCP server and a DHCP client. The method involves forming a DHCP message having a vendor-specific portion including parameters representing configuration information. The parameters are encoded within at least one triplet comprising a code field, a length field, and a value field. The code field includes an indication of encryption of the value field. The value field comprises a set of one or more name-value pairs encrypted in accordance with the code field. The method further involves transmitting the DHCP message including the vendor-specific portion from the DHCP server to the DHCP client.

The use of name-value pairs for the configuration data provides a flexible and self-defining approach to the transport of configuration data. This therefore avoids possible problems with having to accommodate a potentially large number of parameters within a finite set of available code words.

Since some of the configuration data may have security implications (such as user names or even passwords), data for transmission between the server and the client may be encrypted. The particular form of encryption used (if any) is identified in the code field. Note that the code field is available for such a task as a consequence of using name-value pairs in the value field (i.e. the code field does not have to identify the type of value in the value field, given that name-value pairs already do this). Accordingly, when the client receives the DHCP message, it can use the description of the encryption contained in the code field to decrypt the contents of the value field, and thereby access the desired configuration information.

The present approach therefore provides a flexible and secure method for transporting configuration data from a DHCP server to a DHCP client. This is especially useful for parameters that are not formally defined within DHCP—i.e. for parameters that extend the set of configuration data listed in the DHCP standard, and which therefore cannot be accommodated by existing DHCP configuration procedures. At the same, by generally integrating these parameters into the overall DHCP environment, the present approach exploits the widespread support that currently exists for DHCP. For example, the approach described herein is typically transparent to the underlying DHCP mechanisms, and so can be used with existing DHCP servers. This exploitation of the DHCP environment helps to avoid undue complexity, given that there is no need to rely on any additional systems or protocols for performing the configuration.

In one particular embodiment, the vendor-specific information is encoded as multiple triplets, with one name-value pair per triplet. Consequently, there is a separate code field for each name-value pair, which makes it comparatively straightforward to customise the encryption to each particular name-value pair. For example, generic, non-sensitive data can be transmitted in unencrypted (plaintext) form; moderately sensitive data can be transmitted encrypted using a medium length key; while highly sensitive data can be transmitted encrypted using a comparatively long key.

Nevertheless, in other implementations, there may potentially be multiple name-value pairs per triplet. For example, in one embodiment there may be up to eight name-value pairs per triplet. Each bit of a 1-byte code field could then be used to indicate whether or not a corresponding name-value pair is encrypted. In this arrangement, the name-value pairs may each have a predetermined length. This then allows individual name-value pairs within a value field to be identified from one another. Alternatively, a predetermined end code could be inserted between the different name-value pairs in the value field in order to separate them.

If there is only one name-value pair per triplet, then the entire contents of the code field are available to define the form of the encryption of the value field (save possibly for any predetermined special code values, such as perhaps zero to indicate a null triplet). Typically the code field is used to specify the encryption algorithm for the name-value pair, which might be symmetric, such as the data encryption standard (DES), or asymmetric, such as the Rivest-Shamir-Adelman (RSA) algorithm. The code field may also be used to specify the key length used in the encryption algorithm for the name-value pair (e.g. 32, 64 or 128 bits).

If there are multiple name-value pairs per triplet, then the code field may be used in a variety of manners. One possibility is to define a single form of encryption that is applied to all of the name-value pairs in the triplet (so that all name-value pairs in the triplet then utilise the same form of encryption). Alternatively, the code field may be used to define different forms of encryption for the different name-value pairs in the triplet. In the extreme, there may be only one coding bit per name-value pair (as in the example given above), in which case, the same encryption algorithm would again be applied to all name-value pairs in the triplet, except that: (i) the encryption algorithm would have to be predetermined, rather than being specified in the code field, and (ii) individual name-value pairs in the triplet can be selectively sent in plain (unencrypted) form by appropriate setting of the corresponding code bit.

Between these two extremes, it is possible to support different forms of encryption for different name-value pairs in the same value field. For example, if there are only two name-value pairs per triplet, then four bits of a code field could be used for each name-value pair to define the particular form of encryption for that name-value pair (assuming again a 1-byte code field). Note that which of the above approaches is adopted in any given implementation will depend on the particular circumstances (such as the precise nature of the data to be transmitted, etc.).

In one implementation, the encryption is performed using a key specific to the particular DHCP client to which the message is being transmitted. It will be appreciated that this aids security, since sensitive parameters can now only be decrypted on the DHCP client for which they are intended. One way of achieving this is to use an asymmetric encryption algorithm, such as RSA, and for the DHCP client initially to transmit its public key to the DHCP server. The DHCP server can then use this public key to encrypt the configuration message for transmission back to the DHCP client. Alternatively, all DHCP clients in the same installation may be assigned the same cryptographic key, in order to facilitate the re-use of configuration information from one client to another within the installation (as described in more detail below).

In one embodiment, at least one of the parameters included within the vendor specific portion is encrypted, and at least one other parameter included within the vendor specific portion is not encrypted. In some implementations, a given triplet might contain both encrypted and unencrypted name-value pairs (as discussed above). Another possibility is for one triplet to contain one or more encrypted name-value pairs, and another triplet to contain one or more unencrypted name-value pairs.

Note that it is generally beneficial for a variety of reasons not to encrypt data which is not sensitive from a security perspective. Firstly, this minimises the overhead of encrypting/decrypting data. In addition, it helps to promote replication of the same parameter sets between different DHCP clients (especially if the encryption is client-specific, as described above). Furthermore, it is also useful for a human administrator to intervene by hand to modify or simply read the (unencrypted) configuration data.

In one embodiment, the configuration parameters are stored in a repository on the DHCP server, thereby facilitating management and administration of the configuration information. For example, the repository typically allows the stored parameters in the repository to be replicated from one DHCP client to another. This provides a rapid way of setting up parameters for a new client, by copying over configuration parameters from an existing client (possibly with minor adjustments, if necessary). This is especially helpful in managing a large installation, where the number of DHCP clients to be configured may be large.

In one embodiment, it is possible to create or edit the configuration parameters on a DHCP client, and then to transmit these parameters to the DHCP server for storage in the repository. This flexibility is especially useful in system administration. For example, configuration parameters may be entered and tested on one DHCP client. If these configuration parameters are found to be successful, they can then be uploaded to the DHCP server, for replication to other DHCP clients.

Another embodiment of the invention provides a dynamic host configuration protocol (DHCP) server comprising a store containing DHCP information for at least one DHCP client. The DHCP information includes a vendor-specific portion containing parameters representing configuration information for the DHCP client. The configuration information is encoded within at least one triplet comprising a code field, a length field, and a value field. The code field includes an indication of encryption of the value field, and the value field comprises a set of one or more name-value pairs encrypted in accordance with the code field. The DHCP server further includes a network interface operable to transmit a DHCP message including the vendor-specific portion to the DHCP client.

Another embodiment of the invention provides a computer program product comprising program instructions on a medium. The instructions may executed by a machine and cause the machine to form a DHCP message having a vendor-specific portion including parameters representing configuration information. This configuration information is encoded within at least one triplet comprising a code field, a length field, and a value field. The code field includes an indication of encryption of the value field. The value field comprises a set of one or more name-value pairs encrypted in accordance with the code field. The instructions further cause the machine to transmit the DHCP message including the vendor-specific portion from the DHCP server to the DHCP client.

Another embodiment of the invention provides a method of managing a DHCP server having a repository of DHCP client configuration data. The method involves receiving vendor-specific data representing configuration data for the client. The vendor-specific data comprises at least one triplet of a code field, a length field, and a value field. The code field includes an indication of encryption of the value field. The value field comprises a set of one or more name-value pairs encrypted in accordance with the code field. The method further involves storing in the repository the received vendor-specific configuration data for the client.

Another embodiment of the invention provides a method of providing configuration information from a server to a client. The method involves forming a message containing a vendor-specific portion. The vendor-specific portion includes parameters representing configuration information encoded as a set of name-value pairs which are at least partially encrypted. The vendor-specific portion further includes a code segment descriptive of the encryption applied to the set of name-value pairs. The method also involves transmitting the message including the vendor-specific portion from the server to the client.

Another embodiment of the invention provides a method for booting a fixed-function device attached to a network. The method involves storing boot code and a configuration locally to the device, and booting the device using the stored boot code and the stored configuration. Next, a network configuration is downloaded to the device, and this is compared with the stored configuration. If the network configuration is different from the stored configuration, the network configuration is stored locally to the device, and the device is rebooted using the stored network configuration. Alternatively, if the network configuration matches the stored configuration, the device is now ready to perform its fixed function.

Since the initial boot is made using locally stored code, this is both quick, and also robust in the event of network failure. Thus even if the device is unable to download the network configuration, it may still be operated, if so desired, using the local boot code already loaded. On the other hand, the ability to automatically download and implement a configuration from the network assists the centralised and scaleable administration of the device. This is particularly the case for an installation having multiple devices, where it is much easier to update configuration files at (say) a single machine on the network, rather than having to interact separately with each individual device.

For example, existing switches from Cisco already support an IOS command. This command is manually entered into a booted switch, and instructs the switch to reboot and use a configuration from a specific network location. However, this command is completely separate from the normal boot cycle of the switch, and does not provide a scaleable approach to reconfiguration.

It will be appreciated that once the device has booted using the locally stored configuration, there are generally two copies of this configuration on the device. The first copy is provided for execution, typically in RAM, while the other copy represents the stored version in non-volatile storage, such as flash memory or on a hard disk drive. In one embodiment, the network configuration is compared with the stored configuration in non-volatile storage, although in other embodiments, the comparison could be made with the stored version loaded into RAM for execution.

Generally, the comparison of the stored configuration with the network configuration is made by comparing an identifier of the stored configuration with an identifier of the network configuration. It will be appreciated that comparing identifiers is relatively fast and straightforward as opposed to having to compare complete configurations. The identifiers may be version numbers, or any other suitable information derived from or associated with the configuration data (e.g. a size and date last modified, a digital signature, etc.). The identifiers may be stored as part of (or in conjunction with) the configuration itself, or may be generated as and when required.

In one embodiment, downloading a network configuration initially involves downloading only the identifier of the network configuration. If comparison of this identifier with the identifier of the stored configuration indicates a mismatch, then the complete file of the network configuration file is downloaded to the device. This approach has the advantage of not having to download the full network configuration file if (in fact) a matching configuration file is already available stored locally on the device.

Typically the device incorporates a DHCP client. Booting the device then includes transmitting a DHCP request over the network, and receiving a DHCP response to said DHCP request back over the network. In one embodiment, the DHCP response identifies a network location from which the network configuration is to be downloaded using standard DHCP response fields. Alternatively, it is possible for the location from which the network configuration is to be downloaded to be stored locally on the device. It will be appreciated that which of these two approaches is used depends on the particular circumstances. For example, utilising a DHCP server is generally more flexible, but storing the information locally can be more secure and more robust (e.g. in case the DHCP server fails).

If a DHCP server is used, then one possibility is that the DHCP response could be used to include the identifier of the identifier of the network configuration, for example in the vendor extensions field of a DHCP response. This has the advantage that the device can then test immediately to see if there is a match with the stored configuration, without having to make any further network requests.

In one embodiment, the network configuration is downloaded in encrypted form. The encryption used may be specific to the target device, or perhaps generic for a range of devices. The former option provides the greatest security, while the latter option is easier from an administration perspective (the same encrypted configuration file can then be used with multiple devices). Any appropriate encryption technology can be used for these transmissions.

In one embodiment, the network configuration, if stored locally on the device (in the event of a mismatch), overwrites the initially stored configuration. Consequently, when the device reboots, it does so with the newly stored network configuration. This should then match the network configuration downloaded in the new boot cycle, and so allow the device to perform normal processing. Note that rather than over-writing the whole stored configuration file, the network configuration may be used instead to update selected portions of the stored configuration file. For example, the network configuration file may only contain certain parameters. Applying the network configuration in the event of a mismatch therefore updates these parameters in the stored configuration file, but leaves the remaining parameters in the stored configuration file untouched.

In other embodiments, the device may be able to store multiple configurations. In this situation the network configuration does not necessarily need to overwrite the initially stored configuration. Rather, the boot process may use one of the (multiple) stored configurations in accordance with a default order based on predetermined criteria (e.g. boot with the configuration having the most recent date, or stored in a certain directory).

Another embodiment of the invention provides a fixed-function device including non-volatile storage, a network interface, and a processing unit. The non-volatile storage contains boot code and a stored configuration that the device uses to boot with. After this booting, the network interface is used to download a network configuration to the device. The processing unit then compares the stored configuration with the downloaded network configuration. If the network configuration is different from the stored configuration, the network configuration is saved to the non-volatile storage, and the device is rebooted using the stored network configuration. (Otherwise, the fixed function device is enabled to commence its standard processing).

The fixed function device, which may also be referred to as an appliance, may be implemented in specialised (dedicated) hardware. Alternatively, the fixed function device may be implemented on a general-purpose hardware platform running special function software. Examples of appliances that may adopt the approach described herein include switches, firewalls and load balancers, but it will be appreciated that many other appliances could also benefit from a similar approach.

Another embodiment of the invention provides a computer program product comprising program instructions on a medium. When the instructions are loaded into a machine, they cause the machine to perform a method such as described above for booting a fixed-function device attached to a network.

It will be appreciated that the system and computer program product embodiments of the invention will generally benefit from the same particular features described above as the method embodiments of the invention.

Note that the program instructions are typically stored on some fixed, non-volatile storage such as a hard disk or flash memory, and loaded for use into random access memory (RAM) for execution by a system processor. Rather than being stored on the hard disk or other fixed device, part or all of the program instructions may also be stored on a removable storage medium, such as an optical (CD ROM, DVD, etc), magnetic (floppy disk, tape, etc), or semiconductor (removable flash memory) device. Alternatively, the program instructions may be downloaded via a transmission signal medium over a network, for example, a local area network (LAN), the Internet, and so on.

BRIEF DESCRIPTION OF THE DRAWINGS

Various embodiments of the invention will now be described in detail by way of example only with reference to the following drawings in which like reference numerals pertain to like elements and in which:

FIG. 1 is a schematic plan view of a shelf of a rack-mounted computer system in accordance with one embodiment of the invention;

FIG. 2 is a side elevation view of the shelf of the rack-mounted computer of FIG. 1;

FIG. 5A is a diagram illustrating the structure of messages in accordance with the dynamic host configuration protocol (DHCP);

FIG. 5B is a diagram illustrating the structure of the encapsulated vendor-specific extensions field in accordance with DHCP;

FIG. 5C is a diagram illustrating the structure of vendor-specific information in accordance with one embodiment of the invention;

DETAILED DESCRIPTION

Figure 3:
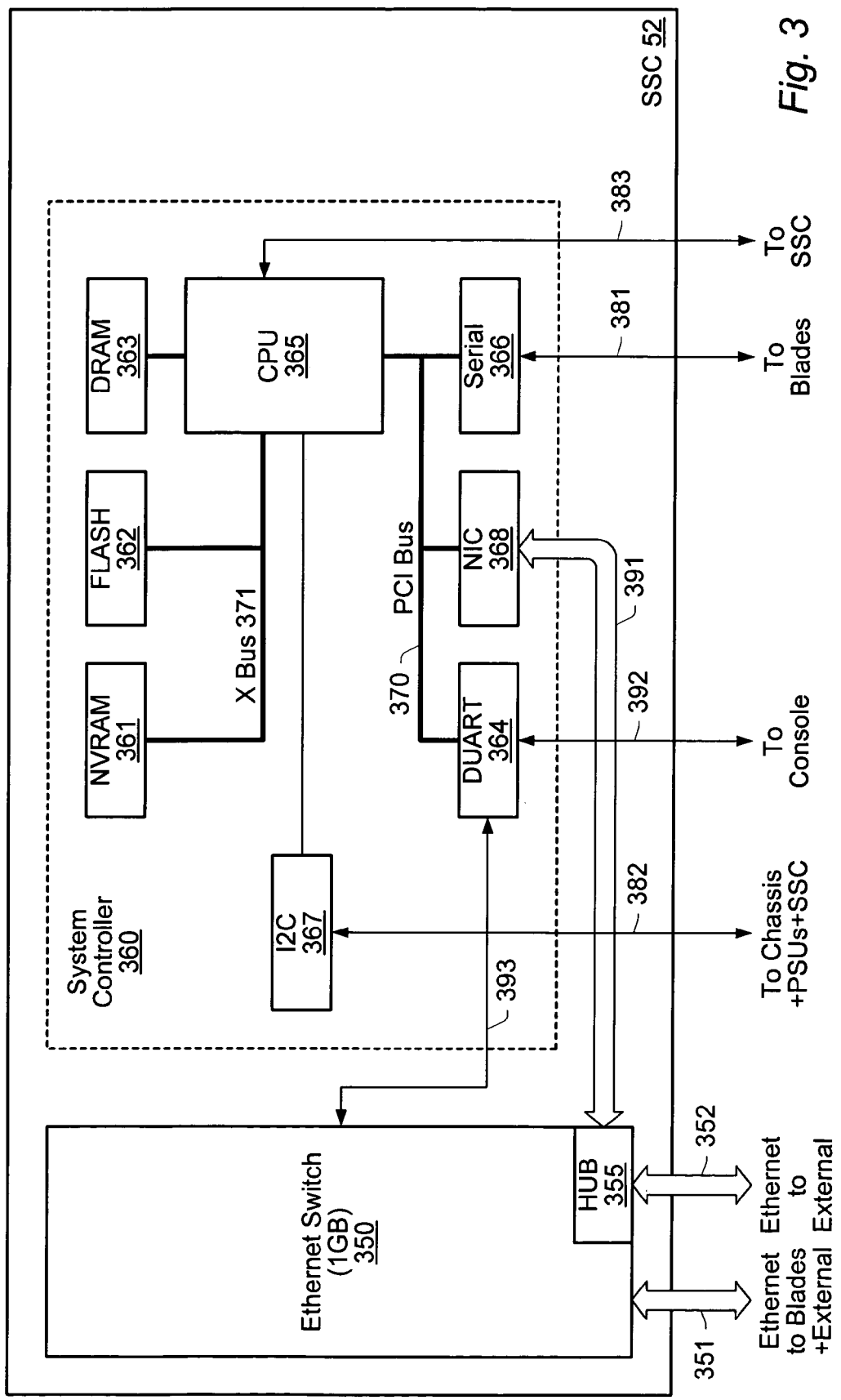
FIG. 3 is a block diagram of a switching and system controller as used in the rack-mounted computer system of FIGS. 1 and 2.

FIG. 1 illustrates a rack-mounted computer system 10, which is typically utilised as a server machine. More particularly, FIG. 1 depicts a plan view of the contents of one shelf (it will be appreciated that system 10 typically incorporates additional shelves), from which it will be apparent that computer system 10 includes a frame or chassis 15. The chassis 15 incorporates a mid-plane 20, which provides a set of connections between components in the front portion of the chassis and those in the rear portion of the chassis. (For orientation purposes, the front wall of the chassis is denoted in FIG. 1 by the reference numeral 18, and the rear wall by the reference numeral 16, with the side walls being marked as 17A and 17B).

The front portion of the chassis is occupied by four processing units known as blades, 40A, 40B, 40C and 40D, which provide the primary processing power of system 10. For clarity, FIG. 1 shows only four blades, but in one particular embodiment a shelf can accommodate up to 16 blades. It will be appreciated that in any given system, one or more blade unit slots may be empty, depending upon the particular computing requirements for that installation.

Each of the blade units 40 is generally similar, although there may be certain differences between them, for example in relation to the amount of memory provided on a particular blade. The blades 40 run independently of one another as separate domains, although groups of two or more blade units may be configured to run in combination for the same application. In this manner, system 10 provides a highly flexible computing resource. Furthermore, the presence of multiple blades provides protection against the failure of a blade unit, in that its processing tasks can then be transferred to one or more other blade units, if so desired.

The rear portion of the chassis is occupied by the components denoted schematically in FIG. 1 as 50A and 50B. The arrangement of these components is seen more easily in FIG. 2, which is a side elevation of system 10, as if seen looking through side wall 17B. It will be apparent from FIG. 2 that space 50B is occupied by two separate devices, one located on top of the other. The lower device is a power supply unit (PSU) 51B, which provides power to the chassis and to the components therein. The upper component in the rear portion of the chassis is a switching and system controller (SSC) 52B, which will be described in more detail below.

Note that the chassis actually contains two power supply units 51A, 51B and two SSCs 52A, 52B. Thus there is one pairing of PSU 51B and SSC 52B located in block 50B, while a corresponding pairing of PSU 51A and SSC 52A is located in block 50A. (This latter pairing is hidden from view in FIG. 2). It will be appreciated that by duplicating both the PSU 51 and the SSC 52, the system 10 is provided with redundancy protection against the failure of any one of these units.

It will also be recognised that the particular server configuration of FIG. 1 is provided by way of example only, and that the skilled person is aware of a wide range of other potential arrangements and configurations for servers and for computer systems in general.

FIG. 3 illustrates the SSC 52 of system 10 in more detail. In one embodiment, the SSC comprises two main components, a 1 Gbit Ethernet switch facility 350 and a system controller 360. Each of these two components is formed as a separate printed circuit board (PCB), with the system controller PCB being mounted as a mezzanine PCB on the switch PCB 350. The Ethernet switch has an Ethernet connection 351 to each of the blades 40 and also to an external network, and a further Ethernet connection 352 via hub 355 that provides separate access to an external network. The Ethernet switch 350 therefore allows data to be transmitted at a high capacity via link 351 between the different blades 40 of system 10, as well as being transferred to or from the network. In normal operations, the Ethernet switches in both SSCs 52A, 52B are concurrently active (i.e. an active-active configuration), in order to provide maximum switching capacity. Note that the internal configuration of switch 350 is not shown in detail in FIG. 3, but rather is discussed in more detail below (see FIG. 8).

The other main component of the SSC 52 is the system controller 360. At the heart of the system controller 360 is a CPU 365, which in one particular embodiment is a PowerPC chip from Motorola Corporation. This is provided with dynamic random access memory (DRAM) 363 and non-volatile random access memory (NVRAM) 361 to support its processing operations, the latter being attached by an X-bus 371. Also connected to the CPU 365 via X-bus 371 is flash memory 362, which in one particular embodiment has a capacity of 16 Mbytes. This is used as a non-volatile store to hold the software to be executed by CPU 365. In particular, flash memory 362 typically stores a loader routine that allows the system controller 360 to boot up, an operating system, which in one embodiment is the VxWorks operating system, available from Wind River Systems Incorporated (see www.windriver.com), and a service control application including a configuration utility.

The system controller 360 also includes a PCI bus 370, to which is attached a dual universal asynchronous receiver and transmitter (DUART) unit 364. The DUART unit 364 provides two serial connections from the system controller 360, the first representing a link 392 to an external console (not shown in FIG. 3), while the second 393 is connected to the switch 350 (on the same SSC 52). The console link 392 allows a user to access various control and administration programs on the system processor, in order to manage operations of system 10. Thus the console can be used to configure the system controller 360, and through it also the individual blades 40.

PCI bus 370 also connects the CPU 365 to a serial bridge 366, which is linked to a serial connection 381 that runs to each of the blade units 40. This is used by the system controller 360 to send appropriate commands to the blade units, and then to receive data and responses back from the blade units. CPU 365 also has a direct serial link 383 to the other SSC in the system, which therefore allows either system controller 360 to take responsibility for overall control and monitoring of the system.

Further attached to the PCI bus 370 is a network interface card 368, which provides an external Ethernet connection via link 391 to hub 355 on the switch 350, and from there over Ethernet link 352. The system controller software supports a management network interface that exposes the diagnostic and operational information collected by the system controller 360 to external application programs. This external monitoring can be performed either from a console, over link 392, or from a remote system over link 391 and an attached network, such as the Internet (not shown in FIG. 3). This external management facility may be used to perform system administration and configuration tasks, such as determining which application will run on which blade, and so on.

The SSC 52 also includes an I2C bridge 367, which connects to an I2C link 382. The I2C link runs to the chassis and to each of the power supply units 51A, 51B, as well as to the other SSC. Note that I2C is an industry standard bus for obtaining diagnostic operating information, such as regarding temperatures and voltages, and was originally developed by Philips Electronics N.V. of the Netherlands. Further information about I2C is available at the page/buses/i2c/available from the site: www.semiconductors.philips.com.

In one particular embodiment, the pair of system controllers 360A, 360B (corresponding to the system controller in SSC 52A and SSC 52B respectively) operates in active-standby mode. In other words, at any given time, only one of the pair of system controllers is actively controlling the operation of system 10. The other (stand-by) system controller then monitors the active system controller, in order to ensure that it is operating properly. If a fault is detected in the active system controller, the stand-by system controller then takes over responsibility for monitoring the system 10 (i.e. the stand-by system controller becomes the active system controller).

Note that although not specifically shown in FIG. 3, in one embodiment the physical routing of each external link from system controller 360 is via the PCB for switch 350. Furthermore, for simplicity, Ethernet links 351 and 352, serial links 381 and 383, and I2C link 382 are all shown in FIG. 3 as single connections. However, it will be appreciated that in practice these links may be implemented using any suitable routing, and by as many separate connections to their respective targets as appropriate.

Figure 4:
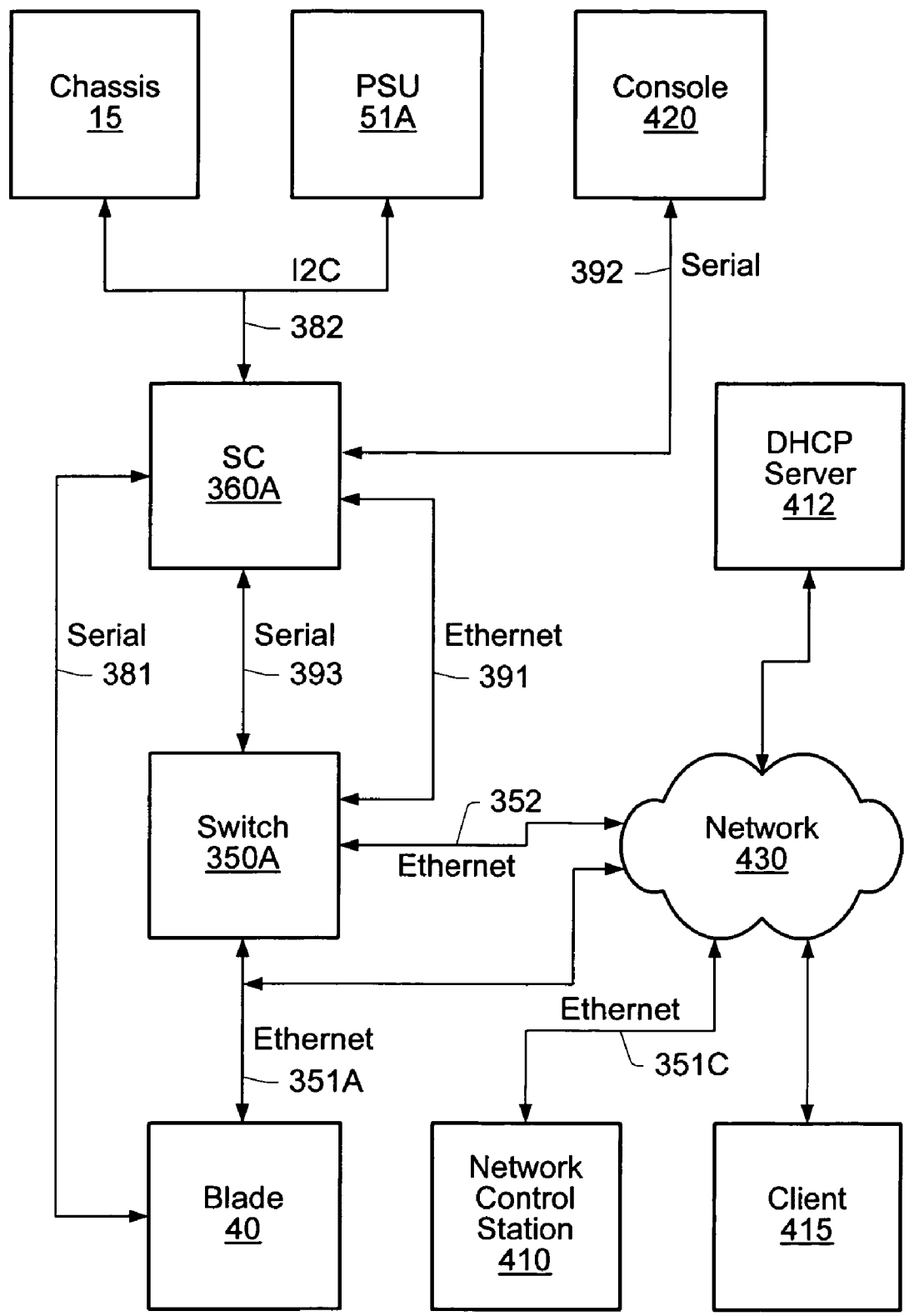
FIG. 4 is a diagram illustrating various connections involving components of the rack-mounted computer system of FIGS. 1 and 2.

FIG. 4 illustrates some of the connections involving system 10. Note that for simplicity, FIG. 4 only includes a single switch 350A, a single system controller 360A, a single PSU 51A, and also only a single blade 40. It will be appreciated that the connections of the omitted components generally mirror the connections of the corresponding components shown. For example, each blade 40 has an Ethernet connection 351A to switch 350A and a serial link 381 to system controller 360A. In addition (although not shown in FIG. 4), each blade 40 also has a separate Ethernet connection to the other switch 350B, and a separate serial link to the other system controller 360B. (Note that there are no links directly from one blade to another).

Switch 350A has a serial link 393 to system controller 360A (i.e. the system controller in the same SSC, namely SSC 52A), and an Ethernet link 351C to an external network 430. Network 430 can represent any suitable form of network, such as the Internet, a corporate intranet or extranet, and so on. As shown in FIG. 4, a client 415 is attached to network 430 (only a single client is shown, but of course in practice the number of clients attached to network 430 may in fact be very large). In a typical installation, client 415 interacts via network 430, switch 350A, and Ethernet links 351A, 351C, with a Web server program running on blade 40, in order to exchange http requests and responses.

The system controller 360A is also provided with an Ethernet link 391 to network 430 via switch 350A and link 352. As previously indicated, this link allows remote control and configuration of system 10 from a remote terminal, such as network control station 410 and/or dynamic host configuration protocol (DHCP) server 412.

Note that in some implementations, Ethernet links 352 and 351C may be connected to different networks. For example, the blades 40 may be attached to the Internet via links 351A and 351C to act as a WorldWideWeb server, whereas for security reasons the system controller 360 may only be accessible via link 352 from an internal network.

Also shown in FIG. 4 is a serial link from system controller 360A to console 420. This typically provides a local interface for controlling system 10 (as opposed to the use of network control station 410). System controller 360A also includes a further serial link to the other system controller 360B (i.e. to the system controller on the other SSC, namely SSC 52B—not shown in FIG. 4). This link allows the stand-by system controller to monitor the operation of the currently active system controller, so that it can take over in the event of a fault. In addition, system controller 360A is also connected to the chassis 15 and power supply unit 50A by an I2C bus 382 for various control and diagnostic operations.

Considering now the operation of DHCP server 412 in more detail, this is governed by Internet standard RFC 2132, which is hereby incorporated by reference. DHCP allows a machine connecting into a network to establish certain information about the network.

In order to make initial contact with a DHCP server, a machine on joining a network first broadcasts a request including some identifier of itself, such as a media access control (MAC) address. This MAC address is generally hard-coded into the machine. In response, the DHCP server 412 returns to the machine various items relating to the local network environment, such as the IP address to be allocated to the machine, the address of a local gateway and the address of a domain name server (DNS). The DHCP server 412 can also be used to control the boot process of a system (such as blade 40). Thus in one embodiment, a blade may be (pre)configured to contact the (DHCP) server 412 for a network configuration and the location of a boot image (i.e. server name, path, and file name). Consequently, the configuration and software running on a client (such as blade 40) can be dynamically controlled at boot time using DHCP 412.

FIG. 5A illustrates the structure of a response 500 from the DHCP server back to a DHCP client. The response incorporates a Code field 510, a Length field 511 and a Value field 512. The Code field 510 is a one-byte field for which there is a predefined set of values to identify the contents of the corresponding Value segment 512. For example, if Code=6, the Value portion 512 comprises one or more addresses of a DNS server. The Length portion 511 is then a multiple of 4, depending upon the number of addresses included in the message (since IP uses 4-byte addresses). Similarly, if Code=3, then the Value segment 512 lists the IP addresses for routers on the client's subnet.

Note that DHCP is a single packet protocol, in the sense that the response from the DHCP server to the DHCP client is limited to a single packet. Thus there is no way to split a DHCP response into two or more packets (rather each DHCP packet received by a DHCP client is regarded as a new response).

There are certain configuration parameters relevant to a blade 40 that are not specifically included within the DHCP standard, for example, the address of a management server. Further such parameters are whether the blade should boot immediately upon power-on, or wait for some predetermined command, as well as various data relating to accessing a lightweight access directory protocol (LDAP) server.

In many existing systems these additional parameters are usually set by hand on an individual basis for each system controller 360, typically using console 420 or possibly network control station 410. The number of parameters involved is usually rather limited (perhaps a few per blade, plus some common parameters, corresponding very roughly to about 100 in total for a shelf). However, if the number of shelves in an installation is large, this represents a time-consuming system administration task, especially since there may be no generalised facility to copy configuration parameters from a system controller on one shelf to a system controller on a different shelf. In other words, the configuration parameters are separately entered for each system controller, despite the fact that there is likely to be a high degree of commonality between the configuration of different shelves.

One option might be to make the desired configuration parameters available in a file on a trivial file transfer protocol (TFTP) server (see RFC1123 for a description of TFTP). The DHCP standard allows the DHCP server to identify such a TFTP server to a DHCP client using Code=18. In particular, the Value field corresponding to Code=18 can be used to provide an extensions path for the DHCP client to locate a configuration file on the TFTP server. However, in general the use of a TFTP server adds another layer of complexity to the system administration task, in that the DHCP server and the TFTP server now need to be maintained in step with one another, and the TFTP server has to be suitably configured and provisioned.

Another possibility is to make use of the facility within DHCP for vendor specific extensions. Thus Code=43 is set aside for this purpose in the DHCP standard, and allows the accompanying Value field to be used for vendor specific information. In practice, vendor extensions within DHCP are not used very widely, due in part to the single packet limitation for DHCP responses. However, the number of parameters to be transmitted in this particular case is rather small (as indicated above), and so can be accommodated within the vendor extensions portion of a single DHCP packet. RFC2132 recommends that if more than one item of information is incorporated into the Value field corresponding to Code=43, then this should be done by using encapsulated vendor-specific options having a structure such as that shown in FIG. 5A (which mirrors the standard DHCP structure of FIG. 5A). Thus the recommended format of the encapsulated vendor-specific information 500A comprises Code field 510A, Length field 511A, and Value field 512A. Note that all of information 500A is then incorporated into the Value field 512 of a DHCP response having Code 510=43.

However, there are two drawbacks with a direct implementation of the structure of FIG. 5B. Firstly, the size of the Code field limits the number of configuration items that can be defined. Assuming a 1-byte Code field, with no predetermined special values, there is a maximum of 256 available Code values. Whilst this number is probably sufficient for most situations, it is desirable to avoid having such a fixed maximum. Secondly, some of the configuration data to be transmitted to the DHCP client may be sensitive from a security perspective, for example, relating to passwords, or accessing information from an LDAP server.

Accordingly, one embodiment of the invention adopts the structure shown in FIG. 5C to encode the vendor-specific information 500A. (As with FIG. 5B the block 500A corresponds to the contents of the Value field 512 associated with Code 510=43 for a DHCP response 500). Again, there is a triplet formation, which can nominally be regarded as corresponding to the Code, Length and Value fields of response 500 (and also 500A). However, in this case, the third field 512B (nominally the Value field) is used to hold one or more name-value pairs, while the first field 510B (nominally the Code field) is used to store an indicator of encryption applied to the third field 512B. The second field 511B of FIG. 5C is used to store a length indicator, as for FIGS. 5A and 5B. (Accordingly, the second field 511B is largely conventional, and will not be discussed herein in detail).

However, there are two drawbacks with a direct implementation of the structure of FIG. 5A. Firstly, the size of the Code field limits the number of configuration items that can be defined. Assuming a 1-byte Code field, with no predetermined special values, there is a maximum of 256 available Code values. Whilst this number is probably sufficient for most situations, it is desirable to avoid having such a fixed maximum. Secondly, some of the configuration data to be transmitted to the DHCP client may be sensitive from a security perspective, for example, relating to passwords, or accessing information from an LDAP server.

Accordingly, one embodiment of the invention adopts the structure shown in FIG. 5B to encode the vendor-specific information 500A. (As with FIG. 5A, the block 500A corresponds to the contents of the Value field 512 associated with Code 510=43 for a DHCP response 500). Again, there is a triplet formation, which can nominally be regarded as corresponding to the Code, Length and Value fields of response 500 (and also 500A). However, in this case, the third field 512B (nominally the Value field) is used to hold one or more name-value pairs, while the first field 510B (nominally the Code field) is used to store an indicator of encryption applied to the third field 512B. The second field 511B of FIG. 5B is used to store a length indicator, as for FIGS. 5 and 5A. (Accordingly, the second field 511B is largely conventional, and will not be discussed herein in detail).

A listing of Name-Value pairs suitable for field 512B might be:

| MGMT_SERVER | = | 112.53.78.210 |
| BOOT_AT_ONCE | = | YES |
| ...... | = | ...... |

Here the first column represents the name of the configuration parameter, while the second column represents the value. The listings are generally defined as ASCII text strings, but the values are then parsed into a suitable format. For example, the first parameter in the above listing represents the address of a management server, and the value is parsed to a four-byte IP address (here represented in decimal), while the second parameter specifies whether or not to boot immediately on power-on, and the value is parsed to a Boolean TRUE/FALSE (here represented as YES/NO).

The use of name-value pair listings has several advantages. They are easy for humans to read and understand, and also to edit (unlike code numbers), while as ASCII text they are highly portable between systems. The self-defining nature of the list also gives great flexibility, in that parameters not required in a particular listing can be easily omitted, while the number of different parameters that can be accommodated is very large (dependent on the size of the name field, although this may be indefinite if the "=" symbol between the name and the value is used to delimit the former).

The Value field may be (partly) encrypted in order to preserve the security of any sensitive information that it contains. The Code field 512B is then used to specify the form of encryption applied to the Value field 512B. This maintains the self-defining nature of message 500A, and exploits the fact that since the name of the parameter is now included in the (nominal) Value field 512B, the (nominal) Code field 510B is freed up for some other task (compared to the arrangement of FIG. 5A).

In one embodiment, each triplet of vendor-specific information 500A comprises a single name-value pair in field 512B. The Code field 510B provides an indication of the encryption applied to this name-value pair. In some implementations, the Code field 510B may contain no more than a binary yes/no indication as to whether the corresponding name-value pair is encrypted. In more complex implementations, the Code field may be used to specify details of the particular encryption employed, such as the key length and/or the encryption algorithm used. For example, a first value of the Code field 510B might indicate the use of an RSA algorithm with a key length of 64 bits, while a second value of the Code field 510B might indicate the use of an RSA algorithm with a key length of 128 bits (with a third value then indicating no encryption at all).

In other embodiments, there may be multiple name-value pairs in a single Value field 512B. In this case, the Code field 510B could in theory be used to specify a set of encryption algorithms, each for use with a corresponding name-value pair in the associated Value field 512B. In practice however, the Code field 510B might not be sufficiently large to do this in full detail. In some implementations therefore, Code field 510B might perhaps be used to specify a single encryption algorithm that is applied to all name-value pairs in the associated Value field 512B.

Note that if there are no security issues associated with a particular name-value pair, then it is generally helpful to have this pair in unencrypted form. This saves the processing associated with encryption/decryption, and also makes it simpler for a human to work with the name-value pair. In addition, it is easier to replicate non-encrypted name-value pairs to other DHCP clients (especially if the encryption parameters are client-specific, as discussed in more detail below).

Figure 6:
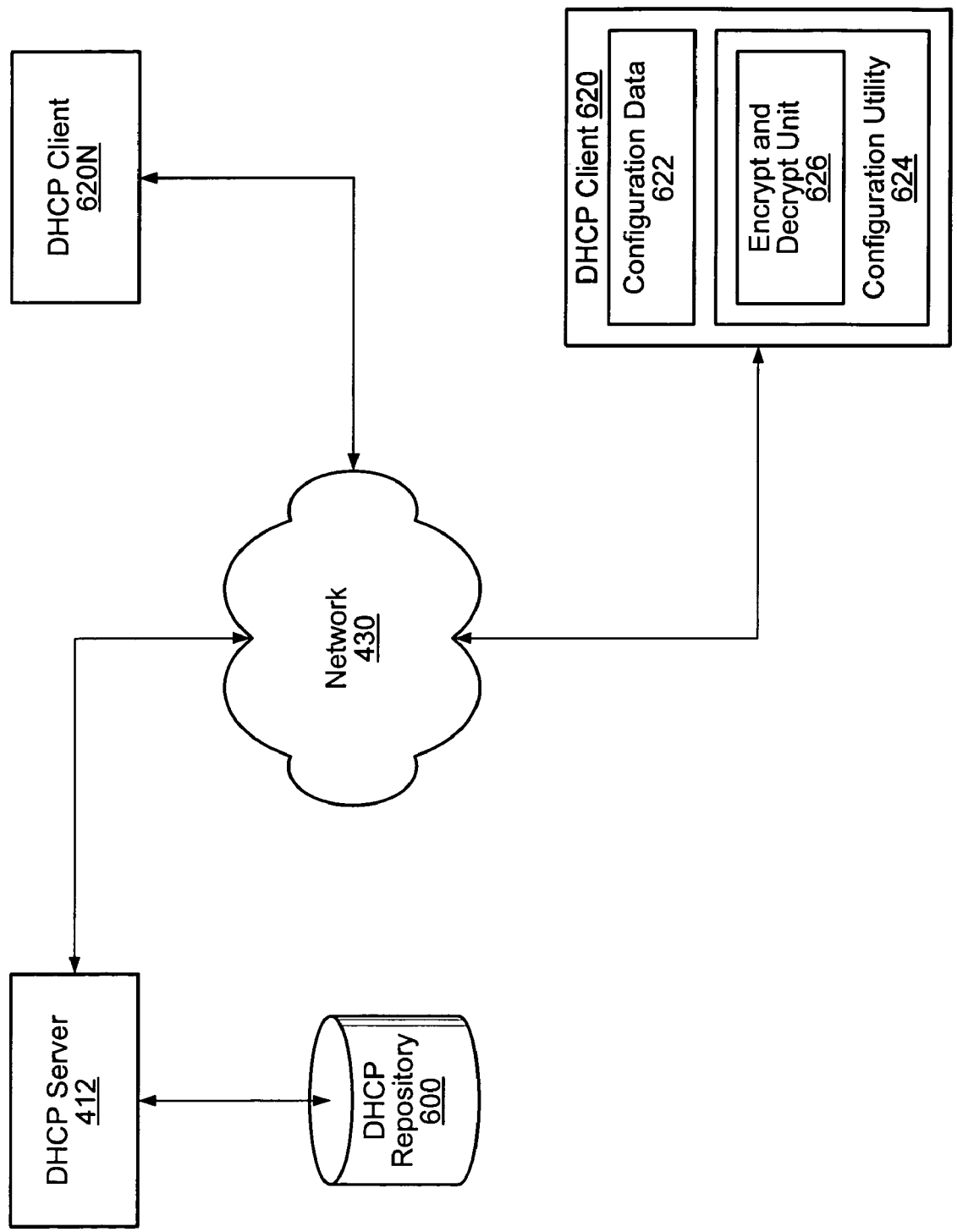
FIG. 6 is a diagram of a DHCP server and a DHCP client for exchanging configuration information in accordance with one embodiment of the invention.

FIG. 6 illustrates various system components in accordance with one embodiment of the invention. In particular, there is a network 430, typically a local area network (LAN) such as an Ethernet, with a DHCP server 412 and multiple DHCP clients 620, 620N attached. Note that a system controller 360 in a shelf of a rack-mounted unit may act as DHCP client 620, and that DHCP clients may join or leave network 430.

The DHCP server includes a repository 600 for storing DHCP information for the various clients associated with network 430. Repository 600 is used to provide persistent storage of network-parameters for network clients. The structure of repository 600 typically involves providing a unique key for each client (such as an IP subnet number, and a machine hardware address, which should be unique within the subnet), followed by a listing of configuration parameters for that client. Repository 600 is also typically provided with a facility for a system administrator to edit the configuration parameters stored in the repository for any given client. (Further details about the DHCP repository service are provided in the aforementioned RFC 2131).

Although the vendor-specific configuration information stored in the DHCP repository 600 adopts at least in part the structure of FIG. 5C (rather than the structure of FIG. 5B of existing systems), it will be noted that this change in the contents of repository 600 is transparent to the DHCP server 412 (and to the repository 600 itself). Hence the DHCP server 412, including repository 600, may be implemented using an existing system without modification to the DHCP server 412 itself, thereby providing compatibility with current systems and networks.

Considering now DHCP client 620, this includes configuration data 622 and a configuration utility 624. The configuration data 622 may be stored persistently on client 620, or may deleted when the client is powered down (to be subsequently reloaded from DHCP repository 600). Configuration utility 624 allows a system administrator to input or edit configuration data 622, and also to upload this data to DHCP server 412 for storage in DHCP repository 600. Note that configuration utility 624 may run (at least in part) on a console 420 or network control station 410 (see FIG. 4).

In accordance with one embodiment of the present invention, configuration utility 624 includes an encrypt/decrypt unit 626. This allows a user to encrypt selected parameters of the vendor-specific configuration information, when these are initially being specified by a system administrator. The encrypt/decrypt unit 626 is also responsible for then setting the corresponding Code field 510B to the appropriate value to indicate this encryption (as discussed above in relation to FIG. 5C). Conversely, when configuration information is downloaded from DHCP repository 600, the encrypt/decrypt unit 626 is able to parse the DHCP information, and perform any necessary decryption on this data, as specified by Code field 510B.

Note that although encrypt/decrypt unit 626 is shown in FIG. 6 as a single component, it will be appreciated that in some other embodiments there may be separate encrypt and decrypt units. For example, the former may be associated with a utility for entering configuration data, the latter with a facility for communicating with DHCP server 412. In some other implementations, the DHCP client may not have any encryption facility, but rather this is located on the DHCP server 412 instead. In this case, any configuration data to be encrypted should be entered directly into DHCP server 412, rather than initially into DHCP client 620.

Figure 7:
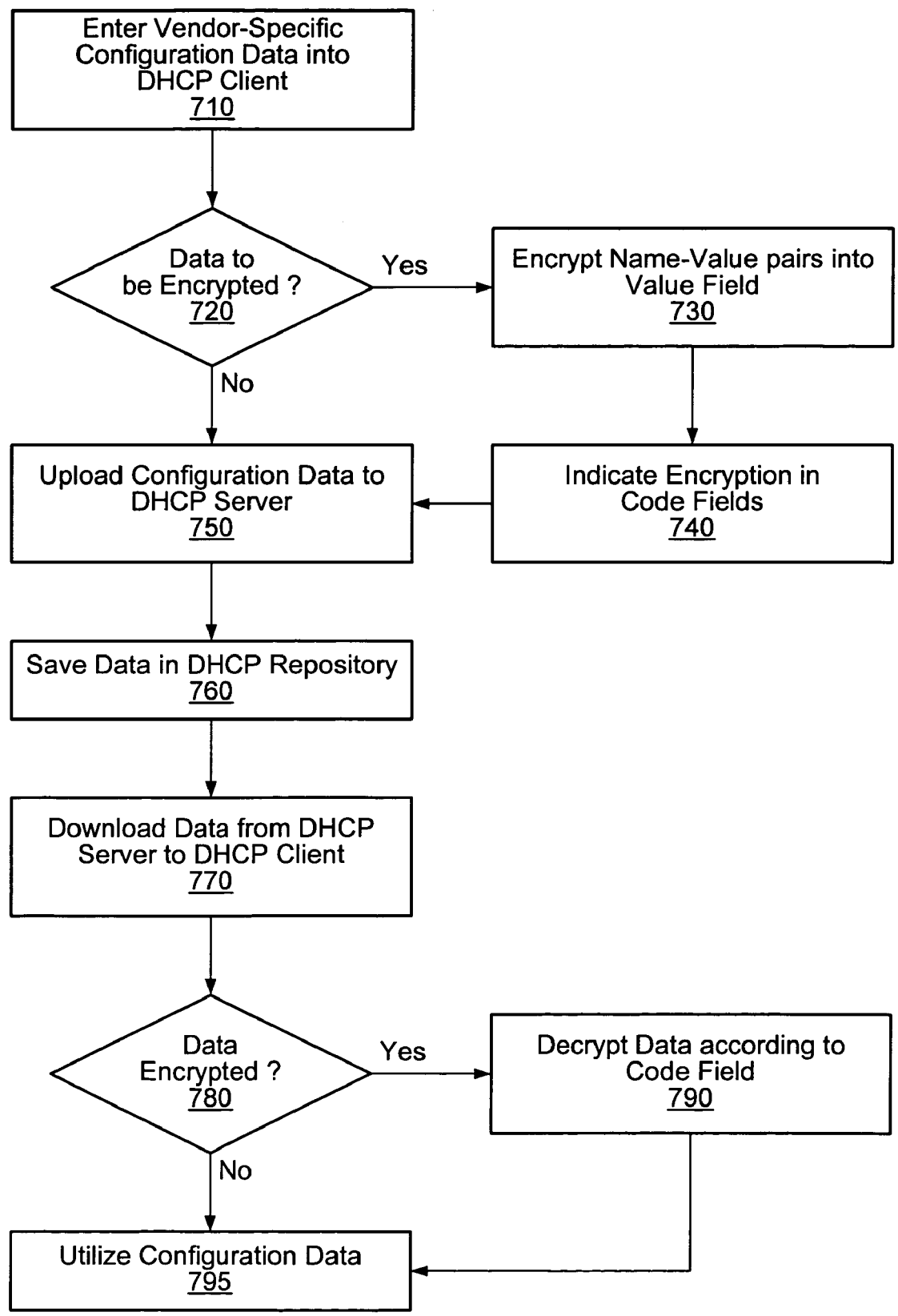
FIG. 7 is a flowchart illustrating the input and use of the vendor-specific information of FIG. 5C in accordance with one embodiment of the invention.

FIG. 7 illustrates a flowchart showing how the configuration data for a DHCP client 620 may be set in accordance with one embodiment of the invention. The method begins with a system administrator or manager entering configuration data for the client 620 (step 710), for example by using the configuration utility 624. The vendor-specific portion of this data, corresponding to Code field 510=43, is provided as a set of name-value pairs, as depicted in FIG. 5C. Next a determination is made to see if any of these name-value pairs are to be encrypted (step 720). In some cases there may be a default encryption setting for certain parameters (according to their name values), or alternatively this may be entirely at the discretion of the system administrator entering the data.

If a parameter is indeed to be encrypted, then the relevant name-value pair is encrypted (or possibly just the value portion of it) (step 730), and an indication of this encryption is entered into the corresponding Code field 510B (step 740). (If no encryption is performed, then Code field 510B will typically have a default value to indicate the absence of encryption). Note that the encryption of steps 730 and 740 may be performed for each name-value pair as it is entered. Alternatively, the test of step 720 and the subsequent encryption of steps 730 and 740 may be delayed until all the name-value pairs for this set of configuration data have been entered.

Once the entry and encryption of the configuration data are complete, then the configuration data is uploaded from the DHCP client to the DHCP server 412 (step 750) (the configuration data may also be stored locally on the DHCP client 620, if so desired). The configuration data from the DHCP client 620 is then saved into the DHCP repository 600 associated with the DHCP server 412 (step 760).

At some subsequent time, the DHCP server 412 receives a request from DHCP client 620 for its configuration data, and in accordance with normal DHCP procedures, the DHCP server 412 responds by retrieving the relevant configuration data from repository 600, and transmitting this data back to the DHCP client (step 770). The DHCP client parses the incoming DHCP data, in order to locate the vendor-specific configuration information corresponding to Code=43. (N.B. any other DHCP information sent by the DHCP server is handled in conventional fashion, and so will not be described here).

The DHCP client tests to see if any of the vendor-specific configuration information is encrypted, as indicated by the Code 510B fields (step 780), and if so it decrypts the data from the corresponding Value 512B fields (step 790). Note that this decryption may be utilises specific information included in the Code 510B field, for example, instructing the DHCP client which particular decryption algorithm to use. Once the incoming data has been decrypted (if necessary), it is now available for utilisation as appropriate (step 795).

Although the processing of FIG. 7 has been described in the context of entering new configuration data into a DHCP client 620, an analogous process could be used to modify (update) a set of configuration data that already existed on a DHCP client 620. The only difference in this case is that the configuration utility used to edit the existing configuration data would typically have to be able to decrypt the initial configuration data in order to permit modification by a system administrator. The revised data would then be encrypted again before transmission to DHCP server 412. (The modified configuration data received at DHCP server 412 would typically overwrite any existing data in repository 600 for that particular DHCP client 620).

Rather than entering the configuration data on a DHCP client 620 (as shown in FIG. 7), in some embodiments this data may be entered directly into the DHCP repository 600 (via DHCP server 412). In this case, the DHCP server 412 typically includes a facility to perform the encryption of steps 720, 730 and 740, rather than having these steps performed on the client. Alternatively, the set of vendor-specific configuration data might be developed on some separate system, and then entered already encrypted (as appropriate) into repository 600.

A further possibility is that a set of configuration data that already exists in repository 600 in respect of one DHCP client 620 is replicated for use by another DHCP client. The replicated data may then be subject to minor adjustments by hand (if necessary) for customisation to its new client.

One potential complication regarding replicating data between different DHCP clients 620, 620N is whether they share the same cryptographic key. If not, then data encrypted for one client could not in general be decrypted by another DHCP client. In some circumstances therefore, it may be helpful for an administrator to provide all DHCP clients in an installation with the same encryption/decryption keys. This then allows the (encrypted) configuration data to be replicated from one client to another without further modification.

On the other hand, if two clients do use different keys, then the encrypted name-value pairs for a first client for replication for a second client will generally need to be decrypted using the key for the first client, and then re-encrypted using the key for the second client. This decryption and re-encryption would typically be performed on DHCP server 410, or on the second DHCP client.

An alternative approach would be for the DHCP repository 412 to store all configuration data in unencrypted form, thereby permitting direct replication from one client to another (within the repository). In this approach, the DHCP server 412 is then modified to encrypt appropriate parameters in the vendor-specific configuration data prior to transmission to a DHCP client. In one embodiment, the DHCP server 412 may be provided with one or more keys for such an encryption process.

Alternatively, DHCP allows a network booting client to pass the DHCP server 412 certain arguments that may be used to indicate the response expected or desired from the DHCP server (i.e. although the client boot process is formally controlled by the DHCP server, the client can influence the outcome by initially supplying arguments to the DHCP server). One possibility is therefore for the DHCP client 620 to inform the DHCP server 620 of the encryption key to use in transmitting the configuration data for that DHCP client. Typically in these circumstances the DHCP client would provide its public key (of an asymmetric encryption algorithm) to the DHCP server, since the communication between the DHCP server and DHCP client is not secure.

Figure 8:
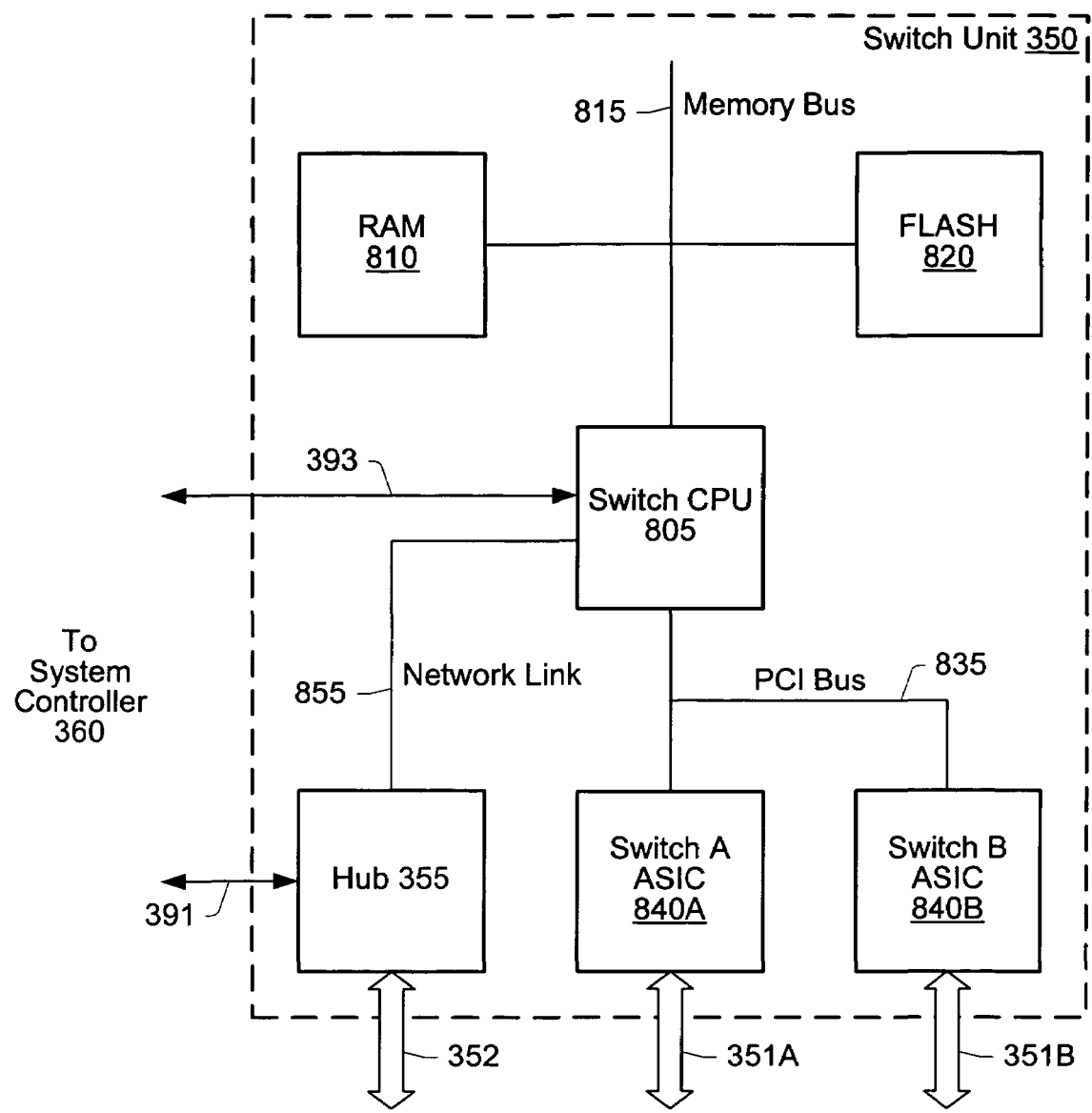
FIG. 8 is a schematic diagram illustrating in more detail the switch component from the switching and system controller of FIG. 3.

FIG. 8 illustrates the main internal components of switch unit 350 (see FIG. 3) in accordance with one particular embodiment of the invention. The switch includes a switch CPU 805, which is attached by a memory bus 815 to RAM 810 and to flash memory 820. The flash memory may be used for storing boot code and default configuration for the switch CPU 805, which are then loaded into RAM 810 at boot time for execution and implementation.

The switch unit 350 further includes two switching application specific integrated circuits (ASICs), denoted as Switch A 840A and Switch B 840B, which are connected to the Switch CPU by a PCI bus 835. Each of these switch ASICs 840A, 840B has 12 Ethernet ports, four of which are linked to external connectors, and eight of which are attached to eight respective blades within the shelf. Consequently, the combination of Switch A 840A and Switch B 840B can service all 16 blades in a shelf, as well as providing a total of 8 uplinks to one or more external networks.

FIG. 8 also shows two further connections into switch CPU 805. The first of these is a serial control link 393 for communicating with the system controller 360 (see FIG. 3). The second connection is a link 855 into hub 355, which in turn provides access to an external network via link 352. This external link 352 is typically used for configuration and administration, as will be described in more detail below. Note that the system controller 360 also uses external link 352 (via hub 355) to provide a facility for configuration, etc.

In some installations, it is known to network boot a component such as the switch CPU 805. This typically involves contacting a DHCP server on a network (such as by using link 352). The DHCP server can then provide the address of a TFTP server from which the boot image and an associated configuration file may be downloaded. However, performing a network boot in this manner can be relatively slow, in that the boot code to download may be fairly large, and there may also be security concerns about executing code supplied over the network.

An alternative approach involves using a locally stored configuration file and code for booting up a system (these could be stored for example in flash memory 820). However, this then complicates system management, in that a system administrator typically has to access multiple different racks in order to update individually the boot code and configuration file for each rack in the system.

Figure 9:
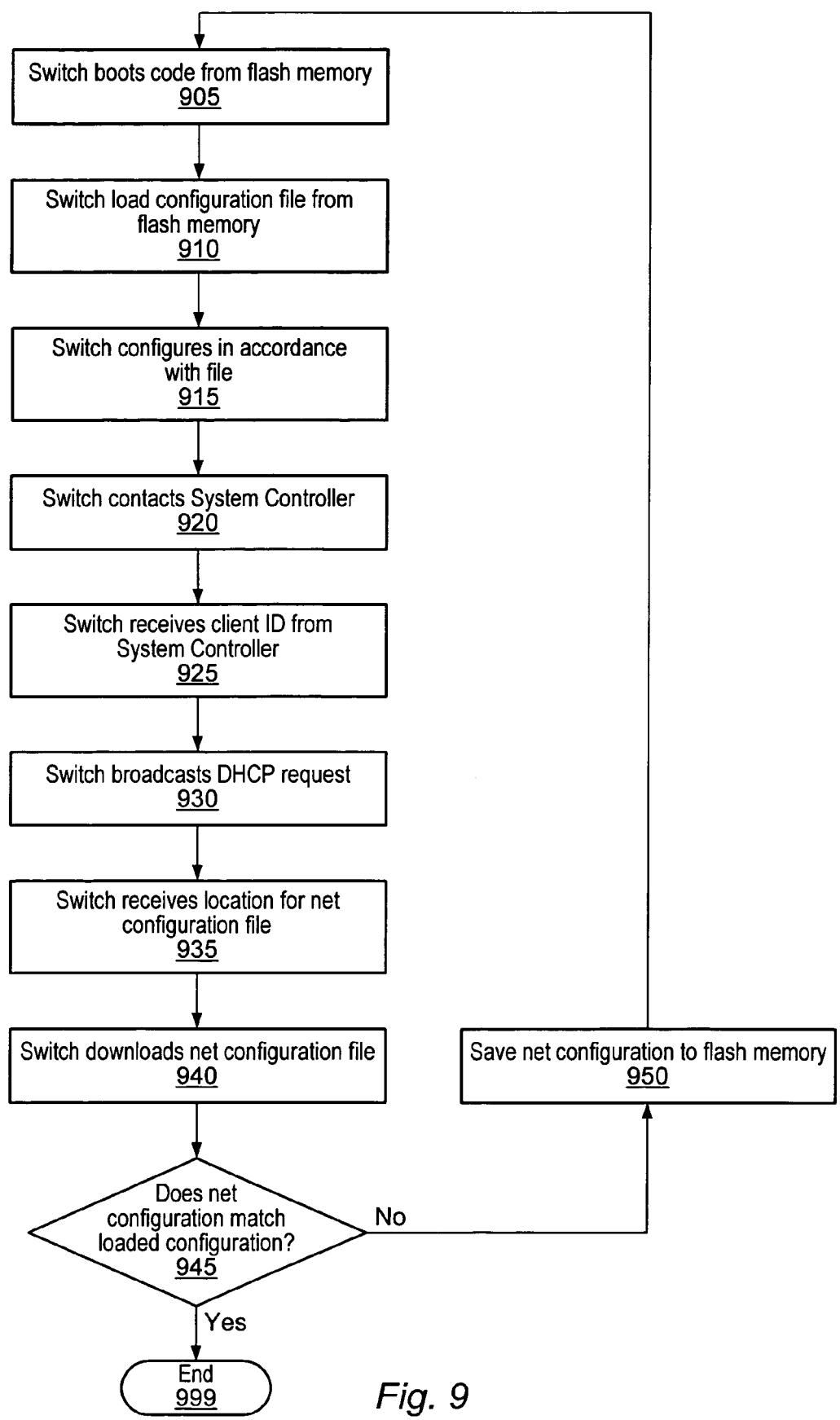
FIG. 9 is a flowchart illustrating the boot process adopted by the switch component in accordance with one embodiment of the invention.

FIG. 9 illustrates a method in accordance with one embodiment of the invention whereby the switch CPU 805 is enabled to boot up from locally stored code in flash memory 805, but is also enabled to download a configuration file over a network. The method commences with the switch CPU 805 booting from code stored in flash memory 820 (step 905), analogous to a conventional local boot. Since this boot is from locally stored code (rather than across a network), there is low latency in bringing the system up.

Next the switch CPU accesses a configuration file that is also stored in flash memory 820 (step 910), and duly configures the switch unit 350 in accordance with this configuration file (step 915). It will be appreciated that there are a wide range of parameters that may be specified as part of the configuration. For example, the configuration may be used to specify port settings, such as the filters (if any) to use on particular ports in order to control whether packets from certain sources should be accepted or denied at that port. The skilled person will be aware of many other parameters that can be set in accordance with a given switch configuration file.

For many switches, the format of the configuration file conforms to an (unofficial) standard set by Cisco Systems Inc (of California, USA). In addition, there is generally a set of default values for the various configuration parameters; a particular configuration file then only specifies those parameters that are to depart from these default values. Typically therefore, a configuration file comprises a set of name-value pairs. The parameters that are identified (by name) in the file are set to the corresponding value in the file. Those parameters that are not listed in the configuration file are set to (or remain at) their default value.

Once the initial boot has been performed, the switch CPU now contacts the system controller 360 (step 920) using serial link 393 (see FIG. 3), and informs the system controller of its presence. In return, the switch CPU receives a client ID from the system controller (step 925). The client ID represents a logical identifier for the switch unit 350 within the overall system. If the PCB of switch unit 350 were to fail and be replaced by another switch unit PCB, then this replacement would receive the same client ID from the system controller 360. Accordingly, the fact that the switch unit 350 had been replaced would be transparent to the other components within the system. (Note that if the switch unit fails to make contact with the system controller at steps 920 and 925, then the boot procedure typically terminates, and awaits operator intervention to resolve).

Assuming that the switch unit does receive a client ID at step 925, the switch unit now broadcasts a DHCP request over link 352 (step 930). In return, the switch unit receives a DHCP response specifying the location of a network configuration file (step 935). It will be appreciated that in making the DHCP request, the switch unit 350 uses the client ID received from the system controller at step 925. The DHCP response can then be made specific to this client ID, if so desired.

In general, the switch unit 350 will also desire an IP address from the DHCP server. In this case, it broadcasts a DHCP REQUEST at step 930, and the DHCP response at step 935 includes not only the location of the network configuration file, but also the IP address for the switch to use (plus any other appropriate information). In other circumstances however, the switch unit may already know its IP address at boot time (e.g. because it is hard-wired into the switch). In this case the switch unit can broadcast a DHCP INFORM message at step 930. This message informs the DHCP server of the presence of the switch unit and also its (hard-wired) IP address, and requests the DHCP server to respond with any other information pertinent to the switch unit (i.e. in this particular case, the location of its network configuration file).

The switch now accesses the location specified in the received DHCP response in order to download the network configuration file (step 940). Note that the configuration file may be encrypted if so desired, using any appropriate encryption algorithm. In one embodiment, this encryption can be done using a symmetric algorithm. Any switch with the appropriate key can then decrypt and deploy the configuration file. (This allows the same encrypted configuration file to be potentially shared between multiple switches).

In another embodiment, the switch unit makes available its public key (from an asymmetric encryption algorithm), and this public key can then be used to encrypt the configuration file. One possibility is for the public key of the switch unit to be stored in a DHCP repository (accessible via the client ID), or alternatively it might be supplied by the switch unit in the initial outgoing DHCP request. The switch unit then uses its corresponding private key from the asymmetric encryption algorithm in order to decrypt the incoming configuration file. Other security measures, such as the use of a digital signature to verify the contents and origin of the configuration file, may also be employed if so required.

The downloaded configuration file is compared with the locally stored configuration file (step 945), in other words, the configuration file that was used to boot the switch unit at step 905. If this comparison finds a match, then the boot and configuration process has completed (step 999). Accordingly, the switch unit 350 now proceeds with its main operational tasks (i.e. to perform switching). This typically involves setting up the appropriate configuration in the switch ASICs 840A, 840B in order to ensure that they switch as desired.

On the other hand, if at step 945 the network configuration file does not match the configuration that was used to boot the switch CPU, then the network configuration file is saved to flash memory (step 950). In doing so, the previously stored configuration file (that was used to boot the switch CPU) is over-written, and the network configuration (now stored in flash memory) becomes the new boot configuration—i.e. the configuration that will be loaded next time the switch is booted up.

Processing now loops back up to step 905, where the system is (re)booted. However, this time, rather than using the originally provided configuration file, the switch unit is instead configured in accordance with the configuration file loaded over the network (and stored into flash memory at step 950). Consequently, after the operations of steps 905 through 940 (as previously described) have been repeated, it is expected that the comparison of step 945 will now yield a positive result. In other words, the stored configuration should this time match the configuration downloaded from the network, since the stored configuration represents the network configuration downloaded and stored during the previous boot cycle. Accordingly, the booting and configuration are now completed, thereby allowing the switch unit 350 to proceed with its main function and to commence switching operations.

Note that the comparison of step 945 may not involve the full configuration files themselves, but rather could be based on some identifier(s) of these files. Such an identifier can typically be derived from some property or parameter of a configuration file. There are a wide variety of suitable properties that could be used for this purpose. For example, one possibility would be to use the size and last modified date of the files. Another possibility would be to calculate some signature of the configuration file, which is formed from some hash or other mathematical function that is sensitive to the precise contents of the configuration file (such signatures are widely used, for example in message verification). A further possibility would be to assign some specific identifying parameter to the configuration file, e.g. a version number (perhaps with revision and modification numbers). Of course, an identifier could represent the combination of two or more such parameters if so desired.

In some embodiments, an identifier may be stored as part of the configuration file itself—e.g. the version number or other identifier might always be located at a specific location within the configuration file, or as one of the Name-Value pairs in the configuration file. In other implementations, the identifier may be generated as and when required from the configuration file (such as the size in bytes). A further possibility is to store the identifier outside the configuration file, but in association with it, for example having the configuration file and corresponding identifier as different entries within the same row of a database table, such as in a DHCP repository or such-like.

Note that the manner of storage for the identifier for the configuration file may vary between the switch unit and the network server used to host the configuration file. For example, the identifier may be specifically stored in the switch unit in conjunction with the stored configuration file. In contrast, on the network server there may be no separate storage of the identifier, but rather this might be determined on-the-fly as and when required.

One advantage using of identifiers for performing the comparison of step 945 is that it is generally easier and quicker to compare two relatively compact identifiers than it is to compare complete configuration files. A further advantage is that the use of identifiers is generally more robust against trivial modifications in the configuration file that might arise as part of the save operation into flash memory, for example changes such as line termination (<CR>/<LF>) or white space (TAB/SPACE).

Furthermore, in some embodiments, the switch unit 350 may only download the identifier for the network configuration file at step 940 (providing the identifier is separately available from the configuration file itself). If a match is found at step 945 (i.e. the identifier for the network configuration file matches the identifier for the stored/loaded configuration file), then no further action is required. This avoids having to download the full configuration file to the switch unit. Rather, the full configuration file is only downloaded should there be a negative outcome to the test of step 945, where such download must occur prior to saving the network configuration file on the switch unit 350 at step 950.

One situation that might occur is where the switch unit has a local stored configuration, which is used for the initial boot, but that the identifier associated with this configuration is somehow lost or otherwise inaccessible. Generally in these circumstances the comparison with the identifier for the network configuration should result in a mismatch, and hence a negative outcome to the test of step 945.

Typically the processing of FIG. 9 is only performed at initial start up of the switch, in particular when the first DHCP request is broadcast from the switch unit. Thus in many installations, a system will periodically broadcast subsequent DHCP requests (renew requests) in order to confirm and maintain status. However, in most embodiments these further requests would not initiate the network configuration procedure of FIG. 9.

Nevertheless, in some implementations it is possible that the DHCP renew requests might indeed be used to trigger a reconfiguration. This can be regarded as repeating steps 930 et seq. (as appropriate) in order to see if a new configuration has been made available for the switch unit on the network. This then has the advantage that any new configuration for the switch is picked up automatically within a fixed time period (corresponding to the DHCP renew time frame). An alternative approach for forcing such a reconfiguration would be to send an explicit command to the switch unit to reboot, thereby starting again from step 905.

Although the flowchart of FIG. 9 has been described in the context of booting up a switch, an analogous procedure could be used with other systems. In particular, the network configuration is especially suited to fixed function devices (sometimes referred to as appliances). Such a device may either comprise specialised hardware (such as the switch unit 350), or a general purpose system dedicated to a particular task (such as a firewall or load balancer). The configuration of such a device can then be regarded as part of its (automatic) initial boot procedure, prior to commencement of the intended functionality (switching, load balancing, or whatever).

Figure 10:
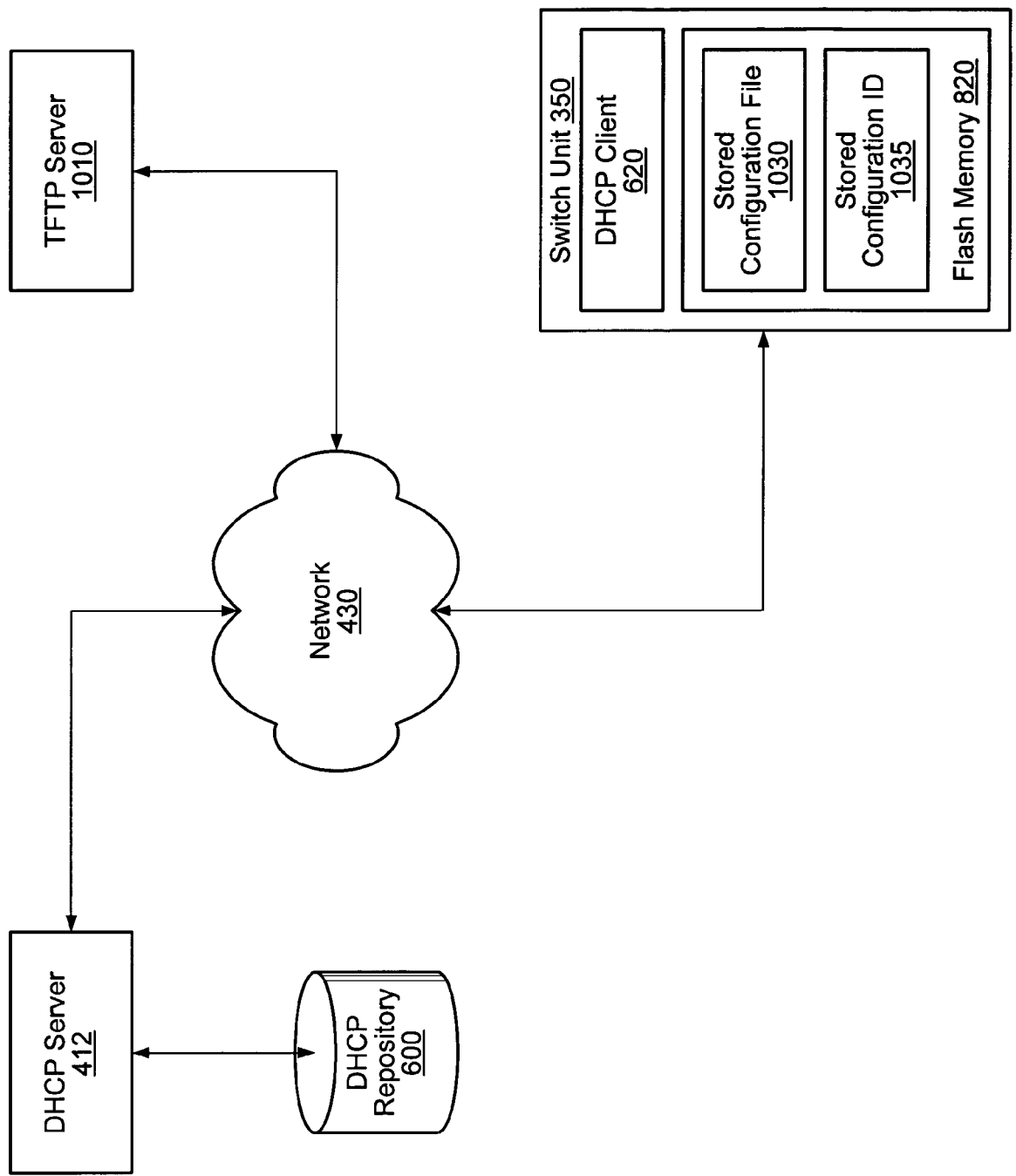
FIG. 10 is a diagram illustrating the switch component receiving configuration information from a DHCP server and a TFTP server in accordance with one embodiment of the invention.

FIG. 10 illustrates the network environment of the switch unit 350 in accordance with one embodiment of the invention. Thus the switch unit 350 is connected to a network 430, such as via link 352 (see FIG. 8). Also attached to the network are DHCP server 412 and its associated repository 600, as well as TFTP server 1010. (Although the DHCP server 412 and the TFTP server 1010 are shown separately in FIG. 10, it will be appreciated that in many cases they may in fact be implemented on the same server system).

As discussed in relation to FIG. 9, the switch unit 350 in one embodiment of the invention stores a local configuration file 1030 in flash memory 820 (or in any other non-volatile memory) together with a corresponding configuration ID 1035. In addition, the switch unit 350 is able to act as a DHCP client 620, and can thereby access DHCP server 412. More particularly, the switch unit 350 includes its client ID in a DHCP request to server 412. This client ID can then be used as a key into DHCP repository to identify the location of the appropriate (network) configuration file for this client ID (i.e. for the switch unit). Typically the configuration file is stored on a TFTP server 1010. Accordingly, the DHCP response from the DHCP server 412 back to the switch unit 350 specifies the network address of TFTP server 1010, as well as the file or path name of the configuration file on this TFTP server. This then allows the switch unit 350 to send a request to the TFTP server for the network configuration file, which is duly returned by the TFTP server to the switch unit. The retrieved configuration file can then be compared with the stored configuration file 1030, or more particularly the stored configuration ID 1035, as previously described in relation to FIG. 9.

It will be appreciated that the DHCP server 412 and the TFTP server 1010 are already likely to be present on network 430 for managing other components of the system (e.g. system controller 360, see FIG. 3). Consequently, from the perspective of DHCP server 412 and TFTP server 1010, the switch unit 350 simply appears as another client to support.

Nevertheless, it will be appreciated that in certain embodiments of the present invention the DHCP server 412 and/or the TFTP server may be omitted. For example, the switch unit 350 may store in non-volatile memory the location (i.e. network address and file name) of its network configuration file. Accordingly, the switch unit could retrieve the network configuration file directly on boot up, without having to first contact the DHCP server in order to obtain the location of the network configuration file. In the context of FIG. 9, this would allow steps 930 and 935 to be omitted. Of course, the switch unit 350 might still contact the DHCP server for other reasons, apart from locating the network configuration file (such as obtaining an IP address to be allocated for use by the switch unit itself).

Furthermore, the network configuration file might be stored on some other form of server, apart from a TFTP server, such as an HTTP server, or any other suitable form of system. This might be the case, irrespective of whether or not a DHCP server is initially used to locate the network configuration file.

Note that one possibility is that the configuration file is encoded into the vendor extensions of the DHCP response itself, such as described above in relation to FIGS. 5, 6 and 7, although this may not be feasible in all situations, given the size limitations on a DHCP packet (for example, a typical switch configuration file might be perhaps 8 Kbytes in size). However, the DHCP vendor extensions field may be particularly suited for providing an identifier for the network configuration file, such as discussed above. This identifier can then be compared with a corresponding identifier for the stored network configuration file, and in the event of a mismatch, the full network configuration file can then be downloaded from the appropriate network location (also included in the DHCP response). The identifier can be stored in the DHCP repository 600 along with the full network configuration file. Alternatively, the identifier may potentially be generated from the full network configuration file as and when required (although the network configuration file will generally be stored on TFTP server 1010 rather than DHCP server 412).

During use of the network boot configuration, it is possible that the switch unit might fail to receive a response from the DHCP server 412 (i.e. at step 935) or from the TFTP server 1010 (i.e. at step 940), perhaps due to network or server failure. Generally the switch unit will then make a predetermined number of attempts to retry communications with the relevant server. Typically the number of retries in such a situation is user configurable.

(Note however that the number of retries used to access the configuration file may well be less than the number of retries for accessing the DHCP server for other reasons. This is because it may be undesirable for a network configuration to be applied suddenly a relatively long time after the initial switch boot in response to a DHCP or TFTP server having just suddenly come on line).

If the retries are still unsuccessful, then the network configuration file is inaccessible to the switch unit. Nevertheless, it will be appreciated that in such circumstances the switch unit is typically able to continue functioning using the locally stored configuration file (that it has already booted with). Accordingly, the approach described herein provides a high degree of reliability, in that even if the network configuration file cannot be retrieved, the system should nevertheless be able to operate using the locally stored configuration.

One possible risk with the approach of FIG. 9 is where network 430 has two (or more) DHCP servers that are approximately equidistant in response time from the switch unit 350 (or other DHCP client). The system generally only waits for the first DHCP response to arrive—any further DHCP responses that are subsequently received are discarded. Consequently, if the configuration details specified by the multiple DHCP servers are inconsistent, i.e. a first DHCP server identifies a first network configuration file, while a second DHCP server identifies a second, different network configuration file, then this can lead to the possibility of oscillation.

In particular, in the first pass through step 940, the switch may receive a DHCP response from the first DHCP server, and consequently download the first network configuration file (which is assumed to be different from the initially stored configuration file). This then leads to the switch unit saving the first network configuration file at step 950, and rebooting. However, if during rebooting the switch receives a DHCP response from the second DHCP server at step 935 prior to receiving any response from the first DHCP server, then the second network configuration file will be downloaded. Since this is different from the stored (first network) configuration file, then we again take the negative branch from step 945, and so the reboot cycle is repeated. Such repetitions would then reoccur until (unless) the switch unit receives responses from the same DHCP server in successive cycles. At this point, step 945 would test positive, and the boot procedure would terminate. (Note that this problem increases with larger numbers of DHCP servers attached to the network, since this decreases the likelihood of the same DHCP server responding first in two successive boot cycles).

Of course, the risk of such oscillations can be readily eliminated, either by having only a single DHCP server, or by having just a single network configuration file. Moreover, even if there are multiple DHCP servers and multiple network configuration files, there will be no problem assuming that these are kept consistent with one another, so that the same network configuration file is downloaded, irrespective of which DHCP server responds first.

It will be appreciated that the approach of FIGS. 9 and 10 can significantly assist with configuration of a complex system in that there is no longer any need to specifically update the locally stored configuration file for each switch unit 350. Rather, a system administrator can perform such configuration centrally by interacting with the DHCP server 412 and TFTP server 1010 as appropriate. In fact, a typical mode of operation might be to develop a configuration file on one switch unit, and then to upload the configuration file to the DHCP and/or TFTP server. This uploaded configuration file would then be replicated at the DHCP/TFTP server for all the various clients supported by that server. The administrator could perform any desired customisation for each particular client by editing on the DHCP/TFTP server, if so desired. Subsequently, next time a client booted up, it would detect the change in its network configuration file (compared to the stored configuration file at the client), and so use the network configuration file to update its locally stored configuration.

Some embodiments may support a partial or selected update to the locally stored configuration. In this situation, the network configuration may only comprise a limited number of parameters. The network configuration is then used to overwrite the corresponding parameters in the stored configuration, but the rest of the stored configuration (i.e. with no corresponding parameters in the network configuration) is left unchanged. This approach might be used for example where an administrator wants to update one or more common settings for multiple systems in an installation, but to leave all the individual system-specific settings unchanged.

One way to accommodate partial configuration updates is to assign each configuration file an identifier that contains a configuration ID, in effect a name for the configuration, and a version number. If during the boot process the switch determines that the network configuration and locally stored configuration have the same configuration ID, but that the version number of the network configuration is more recent (e.g. higher) than the version number of the stored configuration, then it can perform an incremental update as just described. In other words, a network configuration file containing a subset of configuration parameters is downloaded and applied to the stored configuration file in order to update selected parameters of the stored configuration. On the other hand, if the configuration ID of the network configuration is different from the configuration ID of the stored configuration then the switch may download a complete (rather than incremental) configuration file from the network.

Note that in some embodiments, the TFTP server may automatically download both an incremental and a complete configuration file to the switch. It is then the responsibility of the switch to determine which of these two to utilise, based on the comparison of the configuration IDs and version numbers. Alternatively, the switch might specify in its message to the TFTP server whether it is requesting an incremental configuration file or a complete configuration file.

In some implementations, it may be desirable to be able to specifically enable or disable the network configuration procedure on certain units. For example, an installation might have a first unit assigned to a first task (perhaps some management function), and multiple remaining units assigned to a second task (perhaps operational). In this case, the network configuration boot of the first unit might be disabled, firstly to aid security, and secondly to decouple configuration of this unit from configuration of the remaining units.

Although the embodiments so far described have stored only a single configuration file locally, in other embodiments the switch unit might have the facility to store two (or potentially more) configuration files. For example, one system might be able to store both a primary configuration file and also a secondary configuration file. The system would boot by default from the primary file, but use the secondary file to boot from if no primary file were present. The procedure of FIG. 9 would then compare the network configuration file with the primary stored configuration file, and save the network configuration file as the new primary configuration file in the event of a mismatch (including if there were no stored primary configuration file, in which case the network configuration file would differ from the loaded configuration file). In such a system, the secondary configuration file might typically represent a minimal safe configuration file such as might be provided at initial system installation.

In conclusion therefore, a variety of particular embodiments have been described in detail herein, but it will be recognised that this is by way of example only. The skilled person will be aware of many further potential modifications and adaptations that fall within the scope of the claimed invention and its equivalents.

The invention claimed is:

1. A method of passing configuration information between a DHCP server and a DHCP client, the method comprising:
    forming a DHCP message having a vendor-specific portion including at least one parameter representing configuration information encoded as a triplet comprising a code field, a length field, and a value field, wherein said code field includes an indication of encryption of the value field, and said value field comprises a set of one or more name-value pairs encrypted in accordance with the code field;
    storing said at least one parameter of the vendor-specific portion of the DHCP message in a repository on the DHCP server;
    transmitting the DHCP message including the vendor-specific portion from the DHCP server to the DHCP client;
    editing said at least one parameter on the DHCP client; and
    writing the edited at least one parameter from the DHCP client into the repository for storage on the DHCP server.

2. The method of claim 1, wherein the value field of said triplet comprises a single name-value pair.

3. The method of claim 1, wherein the code field is used to define the form of encryption of the value field.

4. The method of claim 3, wherein the code field is used to identify the encryption algorithm used for the value field.

5. The method of claim 3, wherein the code field is used to identify the key length used in the encryption of the value field.

6. The method of claim 1, wherein at least one parameter included within the vendor specific portion is encrypted, and at least one other parameter included within the vendor specific portion is not encrypted.

7. The method of claim 1, wherein said at least one parameter is not formally defined within DHCP.

8. The method of claim 1, wherein said encryption is performed using a key specific to the DHCP client.

9. The method of claim 8, further comprising the client initially transmitting said specific key to the DHCP server.

10. The method of claim 1, further comprising replicating the stored at least one parameter in the repository on the DHCP server for use by one or more other DHCP clients.

11. A dynamic host configuration protocol (DHCP) server comprising:
   a store containing DHCP information for at least one DHCP client, said DHCP information including a vendor-specific portion containing at least one parameter representing configuration information for the DHCP client encoded within a triplet comprising a code field, a length field, and a value field, wherein said code field includes an indication of encryption of the value field, and said value field comprises a set of one or more name-value pairs encrypted in accordance with the code field; and
   a network interface operable to transmit a DHCP message including the vendor-specific portion to the DHCP client;
   wherein said store comprises a repository on the DHCP server, wherein said repository is configured to store said vendor-specific portion including said at least one parameter;
   wherein said network interface is operable to receive an edited version of said at least one parameter from the DHCP client and to write the edited at least one parameter from the DHCP client into the repository for storage on the DHCP server.

12. The apparatus of claim 11, wherein the value field of said triplet comprises a single name-value pair.

13. The apparatus of claim 11, wherein the code field is used to define the form of encryption of the value field.

14. The apparatus of claim 13, wherein the code field is used to identify the encryption algorithm used for the value field.

15. The apparatus of claim 13, wherein the code field is used to identify the key length used in the encryption of the value field.

16. The apparatus of claim 11, wherein at least one parameter included within the vendor specific portion is encrypted, and at least one other parameter included within the vendor specific portion is not encrypted.

17. The apparatus of claim 11, wherein said at least one parameter is not formally defined within DHCP.

18. The apparatus of claim 11, wherein said encryption is performed using a key specific to the DHCP client.

19. The apparatus of claim 18, wherein the specific key is initially received from the DHCP client via said network interface.

20. The apparatus of claim 11, wherein the stored at least one parameter in the repository is replicated on the DHCP server for use by other DHCP clients.

21. A method of managing a DHCP server having a repository of DHCP client configuration data, the method comprising:
   receiving vendor-specific data representing configuration data for said client, wherein said vendor-specific data comprises at least one triplet of a code field, a length field, and a value field, wherein said code field includes an indication of encryption of the value field, and said value field comprises a set of one or more name-value pairs encrypted in accordance with the code field;
   storing the received vendor-specific configuration data for the client in the repository on the DHCP server;
   transmitting said vendor-specific configuration data from the DHCP server to a DHCP client;
   receiving an edited version of said vendor-specific configuration data from the DHCP client and writing the edited version of said vendor-specific configuration data from the DHCP client into the repository for storage on the DHCP server.

22. A method of passing configuration information between a DHCP server and a DHCP client, the method comprising:
   forming a DHCP message having a vendor-specific portion including at least one parameter representing configuration information encoded as a triplet comprising a code field, a length field, and a value field, wherein said code field includes an indication of encryption of the value field, and said value field comprises a set of one or more name-value pairs encrypted in accordance with the code field;
   storing said at least one parameter of the vendor-specific portion of the DHCP message in a repository on the DHCP server;
   transmitting the DHCP message including the vendor-specific portion from the DHCP server to the DHCP client; and
   replicating the stored at least one parameter in the repository on the DHCP server for use by one or more other DHCP clients.

23. A dynamic host configuration protocol (DHCP) server comprising:
   a store containing DHCP information for at least one DHCP client, said DHCP information including a vendor-specific portion containing at least one parameter representing configuration information for the DHCP client encoded within a triplet comprising a code field, a length field, and a value field, wherein said code field includes an indication of encryption of the value field, and said value field comprises a set of one or more name-value pairs encrypted in accordance with the code field; and
   a network interface operable to transmit a DHCP message including the vendor-specific portion to the DHCP client;
   wherein said store comprises a repository on the DHCP server, wherein said repository is configured to store said vendor-specific portion including said at least one parameter;
   wherein the stored at least one parameter is replicated on the DHCP server for use by other DHCP clients.

* * * * *